(12) United States Patent
Feuell et al.

(10) Patent No.: US 11,557,904 B2
(45) Date of Patent: Jan. 17, 2023

(54) BATTERY CHARGING DEVICES AND SYSTEMS

(71) Applicant: CPS Technology Holdings LLC, New York, NY (US)

(72) Inventors: Christine M. Feuell, Whitefish Bay, WI (US); Rebecca M. Conway, Oak Creek, WI (US); Julia A. Mazur, Grafton, WI (US); James C. Douglass, Shorewood, WI (US); Kurt R. Dickmann, Novi, MI (US); Feng Xue, Menomonee Falls, WI (US); William E. Spears, Fort Smith, AR (US); Deborah G. Spanic, Milwaukee, WI (US); Nancy I. Guerra Garcia, Monterrey (MX)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 15/986,580

(22) Filed: May 22, 2018

(65) Prior Publication Data
US 2018/0278078 A1 Sep. 27, 2018

Related U.S. Application Data

(62) Division of application No. 13/566,842, filed on Aug. 3, 2012, now Pat. No. 9,991,730.

(60) Provisional application No. 61/531,996, filed on Sep. 7, 2011.

(51) Int. Cl.
*H02J 7/00* (2006.01)
*G06Q 30/02* (2012.01)

(52) U.S. Cl.
CPC ........ *H02J 7/0031* (2013.01); *G06Q 30/0238* (2013.01); *H02J 7/0013* (2013.01); *H02J 7/0045* (2013.01); *H02J 7/007182* (2020.01); *H02J 7/007184* (2020.01)

(58) Field of Classification Search
CPC .... H01M 2/1072; H02J 7/0086; H02J 7/0013; H02J 7/0045; H02J 7/0031
USPC .................................. 320/107, 109, 112–115
See application file for complete search history.

(56) References Cited

U.S. PATENT DOCUMENTS

| | | |
|---|---|---|
| 3,781,631 A | 12/1973 | Nelson et al. |
| 4,752,545 A | 6/1988 | Brecht et al. |
| 5,594,314 A | 1/1997 | Hagiuda et al. |
| 5,876,873 A | 3/1999 | Mattan |
| 6,007,937 A | 12/1999 | Ruiz Rodriguez et al. |
| 6,188,202 B1 | 2/2001 | Yagi et al. |
| 6,521,371 B1 | 2/2003 | Lavanture |
| 6,791,297 B2 | 9/2004 | Ott et al. |
| 7,101,640 B1 | 9/2006 | Kump et al. |

(Continued)

FOREIGN PATENT DOCUMENTS

| | | |
|---|---|---|
| CN | 201256161 Y | 6/2009 |
| DE | 202011103277 U1 | 11/2011 |

(Continued)

*Primary Examiner* — Zixuan Zhou
(74) *Attorney, Agent, or Firm* — Boardman & Clark LLP

(57) ABSTRACT

A charger for a starting, lighting, and ignition (SLI) battery is provided. The charger includes a base unit having a pair of terminals that are adapted to engage a pair of conductive terminals coupled to a battery unit to electrically couple the base unit to the battery unit. The charger also includes charging circuitry having power conversion circuitry that is adapted to receive primary power and to convert the primary power to a battery power output compatible with a charging voltage of the battery unit.

20 Claims, 4 Drawing Sheets

(56) References Cited

U.S. PATENT DOCUMENTS

| | | | |
|---|---|---|---|
| 7,311,526 B2 | 12/2007 | Rohrbach et al. | |
| D610,083 S | 2/2010 | Chen et al. | |
| D614,126 S | 4/2010 | Chen | |
| 2002/0022159 A1 | 2/2002 | Pierson et al. | |
| 2003/0209375 A1* | 11/2003 | Suzuki | H01M 10/441 180/65.22 |
| 2005/0080641 A1* | 4/2005 | Ronning | G06Q 20/201 705/20 |
| 2005/0269992 A1 | 12/2005 | Lai et al. | |
| 2009/0009142 A1 | 1/2009 | Nishikawa | |
| 2010/0055544 A1 | 3/2010 | Chen et al. | |
| 2010/0264876 A1 | 10/2010 | Powell et al. | |
| 2011/0014501 A1* | 1/2011 | Scheucher | B60K 1/04 429/7 |
| 2013/0031318 A1* | 1/2013 | Chen | B60L 53/14 711/154 |

FOREIGN PATENT DOCUMENTS

| | | |
|---|---|---|
| EP | 0789411 A1 | 8/1997 |
| EP | 1619512 A2 | 1/2006 |
| EP | 1743184 A2 | 1/2007 |
| EP | 1744432 A2 | 1/2007 |
| EP | 2042879 A1 | 4/2009 |
| EP | 2161769 A1 | 3/2010 |
| EP | 2176905 A1 | 4/2010 |
| GB | 1569967 A | 6/1980 |
| JP | 2003068274 A | 3/2003 |
| WO | 2008056316 A1 | 5/2008 |
| WO | 2010022599 A1 | 3/2010 |

\* cited by examiner

BATTERY CHARGING DEVICES AND SYSTEMS

CROSS REFERENCE TO RELATED APPLICATIONS

This application is a divisional of U.S. patent application Ser. No. 13/566,842, filed Aug. 3, 2012, entitled "BATTERY CHARGING DEVICES AND SYSTEMS," now U.S. Pat. No. 9,991,730, which claims priority from and the benefit of U.S. Provisional Application Ser. No. 61/531,996, entitled, "BATTERY CHARGING DEVICES AND SYSTEMS," filed Sep. 7, 2011, all of which are hereby incorporated by reference.

BACKGROUND

The invention relates generally to battery devices and systems and, more particularly, to battery charging devices and systems.

Batteries composed of one or more electrochemical cells capable of converting chemical energy into a more readily usable form of electrical energy are widely employed in many industries and applications. For example, many such batteries are starting, lighting, and ignition (SLI) batteries capable of starting the internal combustion engines of motorcycles, cars, trucks, and other vehicles. Batteries of this type can typically be discharged and replenished with charge in multiple cycles before the life cycle of the battery is depleted. Typically, when an end user purchases a new battery, for example, for integration into a vehicle, such as a motorcycle, the charge level of the battery is unknown. Unfortunately, upon insertion into the user's vehicle, the battery may not function if the charge level of the battery has been depleted, for example, during the time the battery was on a display shelf before purchase. Additionally, charging of such batteries typically requires connection of leads cables to the battery terminals, which can be cumbersome and time consuming. Accordingly, there exists a need for battery systems that overcome these drawbacks with traditional systems.

SUMMARY

The present invention relates to a battery system that includes a battery unit including a pair of conductive terminals coupled to at least one electrochemical cell and being adapted to discharge to provide a power output. The battery system also includes a base unit including a pair of conductive terminal posts adapted to be received within an inner diameter of the pair of conductive terminals to electrically couple the base unit to the battery unit in a tool-less engagement. Additionally, the battery system includes a charging unit including a base having a pair of terminals adapted to electrically couple the charging unit to the battery unit in a reversible, tool-less engagement. The charging unit includes charging circuitry adapted to receive primary power, to convert the primary power to a battery power output suitable for charging the battery, and to transfer the battery power output to the battery unit to charge the battery unit.

The present invention also relates to a charger for a starting, lighting, and ignition (SLI) battery that includes a base unit including a pair of terminals adapted to engage a pair of conductive terminals coupled to a battery unit to electrically couple the base unit to the battery unit. The charger also includes charging circuitry including power conversion circuitry adapted to receive primary power and to convert the primary power to a battery power output compatible with a charging voltage of the battery unit.

The present invention also relates to a point-of-sale battery case that includes a base display unit adapted to display one or more battery units for sale. The battery case also includes at least one charger coupled to or disposed on the base display unit and adapted to receive a battery unit, to receive primary power, to convert the primary power to a battery power output suitable for charging the battery unit, and to transfer the battery power output to the battery unit to charge the battery unit.

DRAWINGS

DETAILED DESCRIPTION

As described in more detail below, embodiments of battery charging systems and point-of-sale battery charging and display systems are provided herein. In certain embodiments, the battery charging system may include a base unit having a pair of electrical terminals that are dimensioned to receive conductive terminals of a battery unit. When this base unit is coupled to a source of power and to the battery unit, the battery charging system may be operable to increase the charge level of the battery unit. Furthermore, in certain embodiments, the battery unit may couple to the base unit of the battery charging system in a tool-less engagement such that the battery unit and the base unit may be decoupled without the use of tools after charging is complete. Still further, in some embodiments, the battery unit may be configured for use with one or more base units of different sizes, shapes, and features, each suitable to adapt the battery unit for insertion into a target vehicle (e.g., a motorcycle, a car, a jet ski, a truck, etc.). As such, in certain embodiments, the battery unit may be a starting, lighting, and ignition (SLI) battery capable of providing power for the starting of an internal combustion engine, such as the internal combustion engine associated with the target vehicle within which the battery is configured to be received.

Presently disclosed embodiments also include point-of-sale battery cases configured to function as charging and display stations for one or more battery units. That is, some embodiments may include a display unit capable of displaying one or more battery units for sale, and the displayed battery units may each be coupled to a charger capable of charging its respective battery unit while the battery unit is on display. To that end, each displayed battery unit may be coupled to a charger having separate but parallel charging circuitry with respect to the other chargers coupled to the display. Further, in certain embodiments, a charge indicator may be provided on each charger or battery unit to indicate to a purchaser the current charge level of the displayed battery unit.

The foregoing features of the disclosed battery charging systems and point-of-sale battery charging and display systems may offer distinct advantages over traditional designs. For example, the provided charging systems may reduce or eliminate the need for the connection of lead cables to the battery unit for replenishment of the battery charge. Further, by providing battery charging and battery charge level indicating capabilities at the point-of-sale, the possibility of an end user unknowingly purchasing a partially or completely uncharged battery may be reduced or eliminated in some embodiments.

Figure 1:
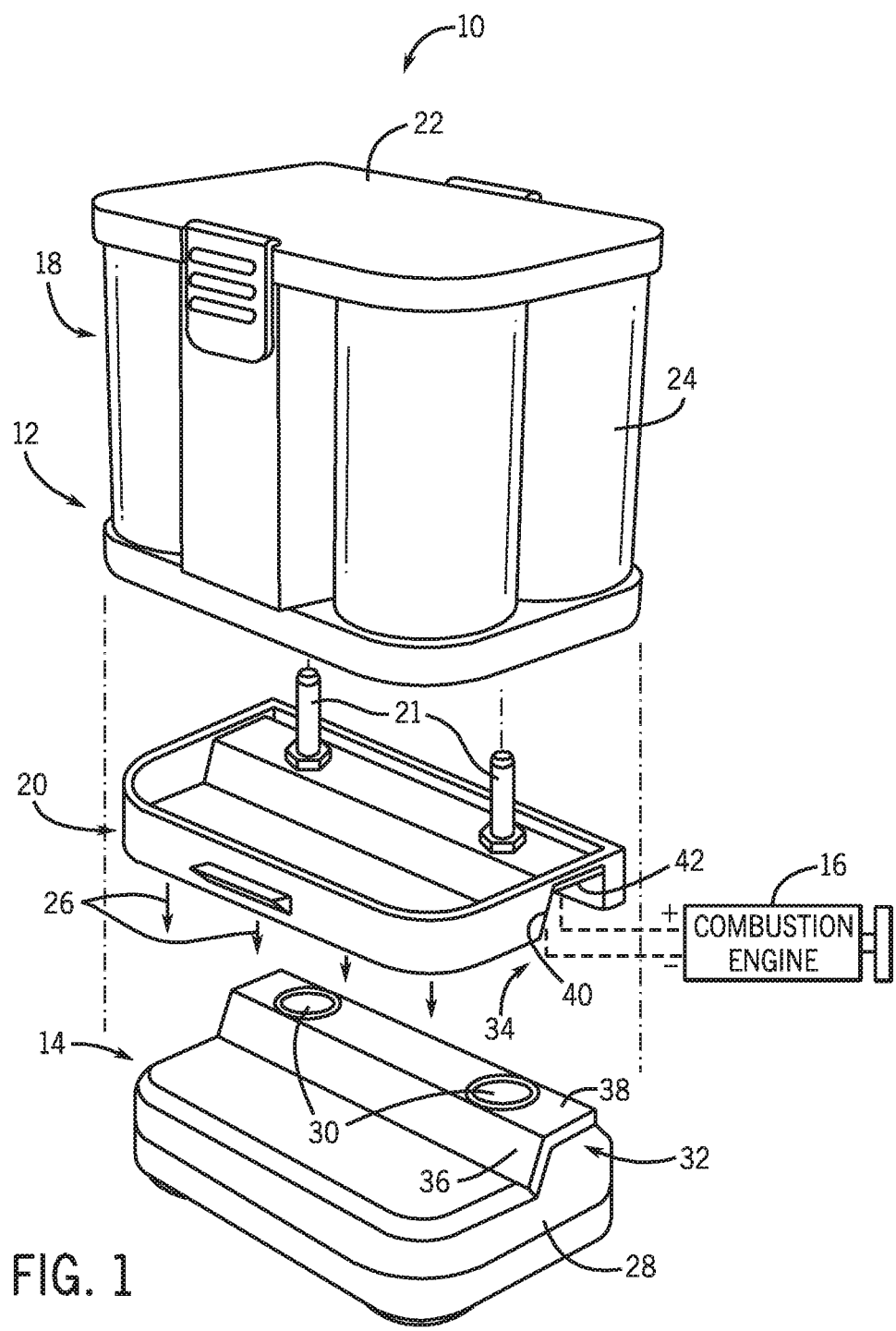
FIG. 1 is perspective view of an embodiment of a charger and a battery unit configured to be received by the charger in a tool-less engagement.

Turning now to the drawings, FIG. 1 is a perspective view of a battery system 10 including a battery device 12 and a battery charger 14. The battery device 12 is configured to be received by both the battery charger 14 in a nesting arrangement, for example, to increase the charge level of the battery device 12, as well as a vehicle, for example, for the starting of a combustion engine 16. As understood by one skilled in the art, when placed in a vehicle, the positive and negative conductive terminals of the battery device 12 couple to the respective positive and negative connections to the combustion engine 16. It should be noted that in certain embodiments, the combustion engine may be associated with any suitable vehicle, such as a motorcycle, a car, a truck, an aircraft, a snowmobile, an all-terrain vehicle, a tractor, a jet ski, a lawn or garden vehicle, or any other suitable vehicle that is powered by a combustion engine.

As such, in certain embodiments, the battery device 12 may be a SLI battery having internal components suitable for providing power for the starting of the internal combustion engine 16. For example, in the illustrated embodiment, the battery device 12 is an enclosed or sealed device that includes a battery unit 18 and a base unit 20. Battery devices of this type are known in the art, and their components, manufacture, and operation have been previously described in U.S. Pat. No. 6,265,091, which is hereby incorporated by reference in its entirety. As shown, the battery unit 18 includes a cover 22 and a housing 24 that maintain a seal around one or more electrochemical cells (e.g., thin metal film battery cells) capable of discharging to provide power and being recharged, for example, by charging unit 14. Each of these electrochemical cells is internally connected to common positive and negative terminals to form the battery. As understood by those skilled in the art, the number and type of provided electrochemical cells defines the capacity and type of battery that is provided.

The base unit 20 includes positive and negative terminal posts 21 that are adapted to couple with the conductive positive and negative terminals of the battery unit 18 to electrically couple the battery unit 18 to the base unit 20 in a tool-less engagement. In one embodiment, the positive and negative terminals of the battery unit 18 may be cylindrical and sized to fit within an inner diameter of cylindrical terminal posts disposed in the base unit 20. However, in other embodiments, the base unit 20 and the battery unit 18 may be configured to be electrically coupled in a variety of suitable ways, such as by providing terminals and posts of other shapes or configurations (e.g., side terminal posts on the battery unit 18). As previously noted, when coupled together, the battery unit 18 and the base unit 20 form the battery device 12. Here again, features of the base unit 20 and the battery unit 18 are described in more detail in U.S. Pat. No. 6,265,091, which is incorporated by reference to the present disclosure. Of note is the fact that the base unit 20 is susceptible to considerable variations in design features, such as size, shape, and so forth, to render the battery device 12 compatible with the desired system that the battery is designed to service. For example, in some embodiments, a first base unit design may be compatible with use in a motorcycle while a second base design may be compatible for use in a truck.

As indicated by arrows 26, once the base unit 20 and the battery unit 18 are assembled to form the battery device 12, the battery device 12 may be coupled in a tool-less engagement to the charging unit 14 for the replenishment of the charge of the contained electrochemical cells. Accordingly, the charging unit 14 may include one or more features that enable the battery device 12 to be electrically and/or physically coupled to the charging unit 14 in a nesting arrangement. For example, in one such nesting arrangement, a portion of the battery device 12 is adapted to be placed inside a portion of the charging unit 14 to facilitate the flow of electrical energy from the charging unit 14 to the battery device 12. In the illustrated embodiment, the charging unit 14 includes a base unit 28 having a pair of terminals 30 that are capable of electrically coupling the base unit 28 to the battery device 12 via the conductive terminals of the battery device 12. In some embodiments, the battery device 12 may couple to the base unit 28 via terminals 30 in a tool-less engagement. For example, the base unit 28 and the battery device 12 may couple together via an interference fit between the terminals of the battery and the terminals 30 of the charging unit.

Still further, the charging unit 14 may include one or more alignment features capable of guiding the battery unit 12 into the correct alignment with the charging unit 14 for proper electrical coupling. In the illustrated embodiment, an alignment guide 32 disposed on the base unit 28 of the charging unit 14 corresponds with an alignment guide 34 disposed on the base unit 20 of the battery device 12. As shown, the alignment guide 32 includes a slanted portion 36 and an extended portion 38 each configured to engage a slanted portion 40 and an indented portion 42, respectively, of the base unit 20. These alignment guides 32 and 34 are configured to ensure that the battery device 12 is inserted into the charging unit 14 in the correct orientation. It should be noted, however, that the illustrated alignment guides are merely examples, and any suitable alignment system may be developed in presently contemplated embodiments.

Furthermore, it should be noted that the illustrated battery device 12 and charging unit 14 are merely examples, and, as such, the features of the illustrated battery devices and charging units may be subject to considerable variations in size, shape, and placement based on factors such as the type of vehicle in which the battery may be disposed, the battery size, and so forth. Accordingly, features of the charging unit and the battery device may have configurations other than those illustrated that are within the scope of the disclosed battery systems. For example, in certain embodiments, the charging unit 14 may couple to another area of the battery unit (e.g., the top of the battery unit, side terminals of the battery unit, etc.).

Figure 2:
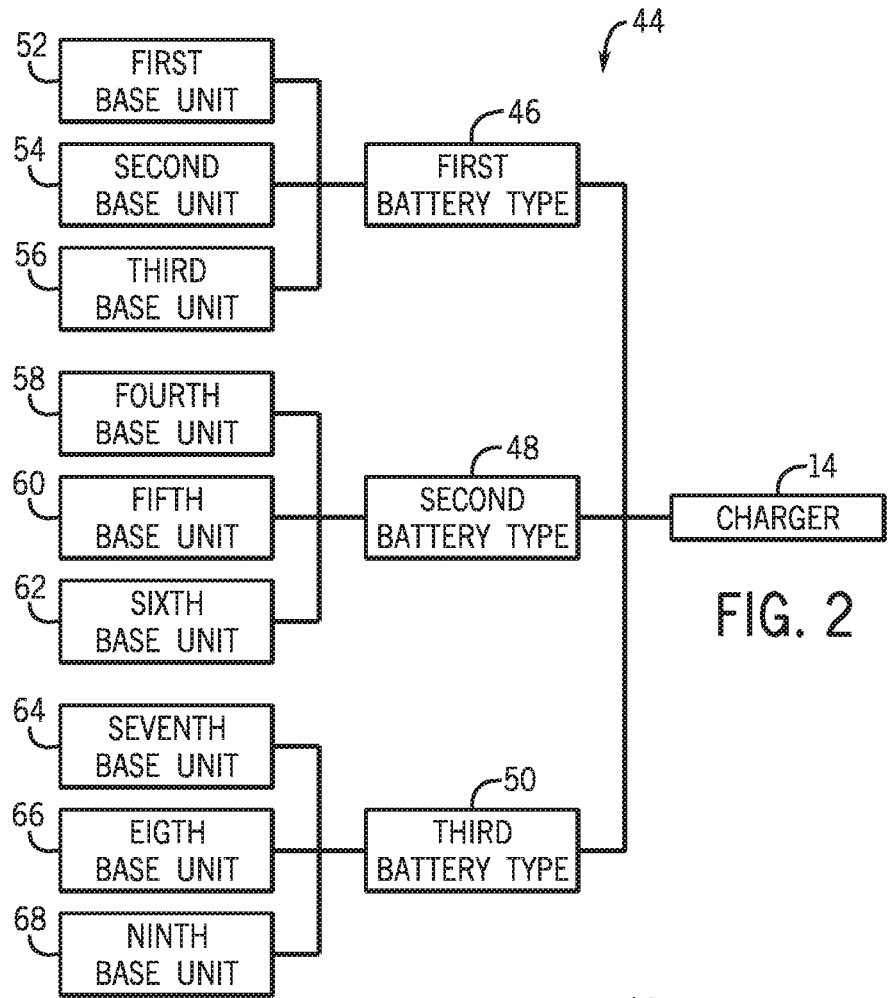
FIG. 2 is a block diagram illustrating exemplary combinations of base units, battery units, and chargers in accordance with embodiments of the present invention.

FIG. 2 is a block diagram 44 illustrating adaptability of the charging unit 14 for use with a variety of types of batteries. That is, in presently contemplated embodiments, a single charging unit may be capable of charging a variety of types of batteries suitable for use in a variety of types of vehicles. Specifically, in the illustrated embodiment, a first battery type 46 (e.g., a battery having a 12 volt, 1.2 amp hour capacity), a second battery type 48 (e.g., a battery having a 12 volt, 2.4 amp hour capacity), and a third battery type 50 (e.g., a battery having a 12 volt, 4.8 amp hour capacity) are all compatible with a single charging unit 14. That is, in many embodiments, a single charging unit 14 may be configured to charge more than one battery type, and the battery types may have different capacities.

Further, each battery type 46, 48, and 50 may be configured for use with multiple base units to enable each battery type to be utilized in a variety of different vehicles. For example, in the illustrated embodiment, the first battery type 46 may be interchangeably coupled to a first base unit 52, a second base unit 54, or a third base unit 56. That is, each base unit 52, 54, and 56 may be configured to adapt the first battery type 46 for integration in a different type of vehicle (e.g., a motorcycle vs. a car), a different model of the same vehicle type (e.g., a first motorcycle model vs. a second motorcycle model), and so forth. Similarly, the second battery type 48 may be interchangeably coupled to a fourth base unit 58, a fifth base unit 60, or a sixth base unit 62, and the third battery type 50 is suitable for use with the seventh base unit 64, the eighth base unit 66, or the ninth base unit 68. Here again, each of the base units may adapt the battery type for use with a different desired vehicle.

Figure 3:
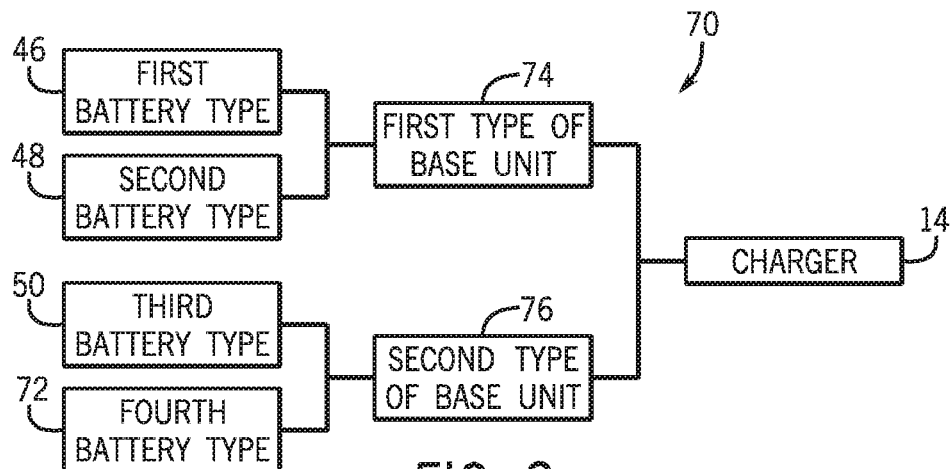
FIG. 3 is a block diagram illustrating alternate exemplary combinations of base units, battery units, and chargers in accordance with embodiments of the present invention.

Still further, as additionally illustrated in a block diagram 70 in FIG. 3, each battery type 46, 48, 50, and 72, may be configured to interface with the charging device 14 via a first type of base unit 74 or a second type of base unit 76. In other embodiments, however, any number of battery types and types of base units may be provided, not limited to the illustrated quantity of these components. In the illustrated embodiment, the first type of base unit 74 is configured to receive both the first battery type 46 and the second battery type 48, and the second type of base unit 76 is configured to receive the third battery type 50 and the fourth battery type 72. Further, the charging unit 14 is capable of charging a battery coupled to either the first type of base unit 74 or to the second type of base unit 76. Therefore, in these embodiments, a single charging unit 14 may be adapted to receive a variety of base units, thus adapting the charging unit 14 for charging of multiple types of batteries.

Figure 4:
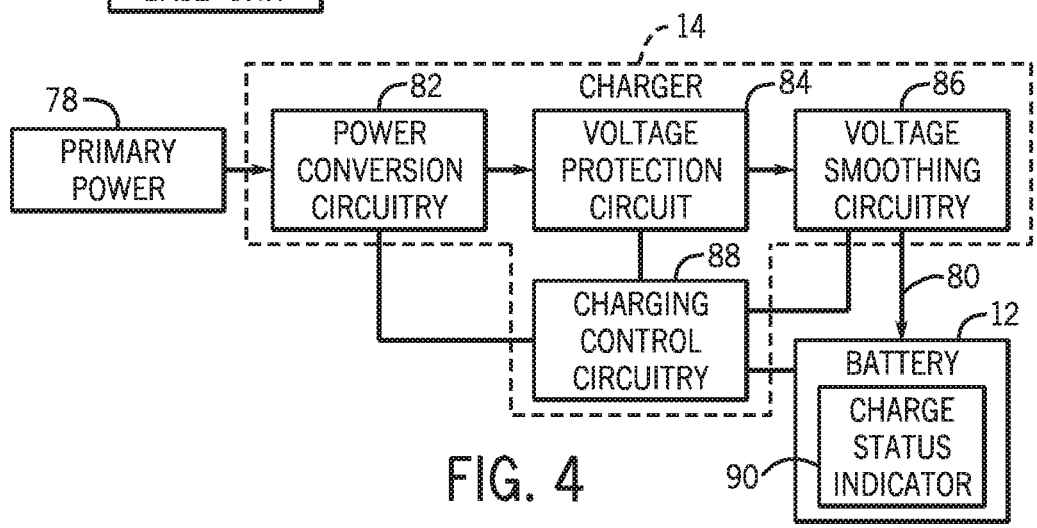
FIG. 4 is a block diagram illustrating exemplary internal components of an embodiment of the charger of FIG. 1.

FIG. 4 is a block diagram illustrating exemplary internal components of an embodiment of the charging unit 14. As shown, the illustrated charging unit 14 receives primary power 78 and converts this primary power 78 to a suitable battery power output 80 for charging of the battery 12. To that end, the charger 14 includes power conversion circuitry 82, a voltage protection circuit 84, voltage smoothing circuitry 86, and charging control circuitry 88. Additionally, the illustrated battery 12 includes a charge status indicator 90 capable of indicating a feature of the charge state of the battery 12 to a user. For example, in one embodiment, the charge status indicator may be a visual indicator, such as a light emitting diode (LED), that is illuminated in colors that correspond to the charge state of the battery (e.g., red indicates a discharged state, green indicates a charged state, and yellow indicates a partially charged state). For further example, in another embodiment, the charge status indicator 90 may be a visual indication panel capable of displaying a percentage corresponding to the ratio of the current charge level to the total possible charge level that defines the battery's capacity.

During operation of the illustrated embodiment of the charger 14, the power conversion circuitry 82 receives primary power 78, for example, from a suitable wall outlet, generator, or so forth, and converts the received power to a voltage suitable for charging of the downstream battery 12. For example, in one embodiment, the primary power may have a voltage of approximately 120 volts, and the power conversion circuitry 82 may step down that voltage to a voltage of approximately 15 volts. However, in other embodiments, the power conversion circuitry may convert or condition the incoming power in any way necessary to produce an output suitable for charging of the battery 12.

In certain embodiments, the output from the power conversion circuitry 82 may be routed to the voltage protection circuit 84. In these instances, the voltage protection circuit 84 may include components such as fuses, inductors, diodes, capacitors, and so forth, capable of reducing or preventing the likelihood that the voltage delivered to the battery 12 exceeds a preset voltage limit. Additionally, if desired, the voltage smoothing circuitry 86 may further process the output from the power conversion circuitry 82 to generate the battery power output 80. For example, the voltage smoothing circuitry 86 may rectify, amplify, smooth, or otherwise process the power conversion circuitry output to generate the battery output 80. Once processed in this manner, the battery power output 80 is delivered to the battery 12 for charging of the battery 12 to or near its capacity.

The charging control circuitry 88 is provided for the monitoring and control of the process of producing the battery power output and delivering the output to the battery 12. That is, the charging control circuitry 88 may receive information regarding the capacity of the battery 12, monitor the charge level of the battery 12, and direct the power conversion circuitry 82 to produce and deliver the correct output to the battery for recharging. Further, in some embodiments, the control circuitry 88 may control the charging circuitry to reduce or stop production of the battery power output when the battery is fully charged.

It should be noted that the illustrated components are merely examples, and that the charging circuitry is susceptible to various modifications within the scope of the present disclosure. For example, in certain embodiments, the charger 14 may be configured to function solely as a power converter capable of converting the primary power 78 to the battery power output 80. In these embodiments, the battery 12 may include additional circuitry capable of recharging the battery with the received battery power output 80. Additionally, in certain embodiments, the charging control circuitry 88 may be located in the charger 14, the battery 12, or any other device or system, such as in an associated wireless control system.

Figure 5:
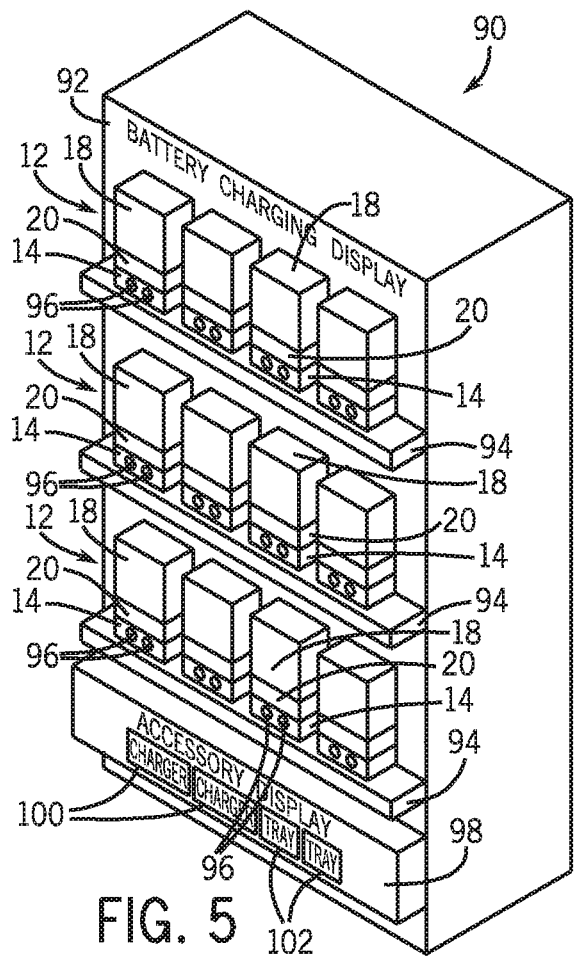
FIG. 5 is a perspective view of an embodiment of a point-of-sale battery charging display.

FIG. 5 illustrates a point-of-sale battery charging and display case 90 from which partially and fully charged batteries may be purchased by an end user. The point-of-sale case 90 includes a base display unit 92 configured to display battery devices 12 for sale. In the illustrated embodiment, the battery devices 12 include the battery unit 18 and the base unit 20. However, in other embodiments, the battery devices 12 may be any suitable type of battery configured for use in any type of vehicle or system. Nevertheless, as shown, the battery devices 12 are coupled in a tool-less engagement to the charging units 14, which are integrated with the battery display 92 via shelves 94. The foregoing feature enables the battery devices 12 to be simultaneously charged and displayed for sale. This feature may offer advantages over pre-existing systems because the battery devices 12 may be purchased in a fully charged state. Further, when the purchaser identifies the battery device that is desired for purchase, the purchaser may disengage the battery device 12 from the charging unit 14 without the use of tools.

Additionally, the charging units 14 integral with the shelves 94 of the battery display case 92 may include indicators 96 capable of indicating a parameter of the charge state of the battery devices 12 to the purchaser. For example, in one embodiment, the indicators 96 may be visual indicators, such as illumination devices, capable of communicating a fully charged state, a partially charged state, or a discharged state of the associated battery to the purchaser. It should be noted, however, that the indicators 96 may be located anywhere on the display unit 92, on the charging units 14, on the battery device 12, or in any other suitable location to indicate a parameter of the charge state of the batteries for sale to the purchaser. Here again, this feature may enable a purchaser to purchase a battery with a desired charge level, thus reducing or eliminating the possibility that a purchaser will unknowingly purchase a discharged battery or a battery with a charge level below a desired level.

In the illustrated embodiment, the battery charging and display unit 92 also includes an accessory display 98 configured to display one or more battery or vehicle accessories for sale. For example, the illustrated accessory display 98 includes packaged chargers 100 and packaged trays 102 for use with the displayed battery devices 12. However, any quantity and type of associated accessories may be displayed on the battery charging and display unit 92. Further, it should be noted that the charging and display unit 92 is susceptible to considerable modifications that enable the charging and sale of many different types of batteries. For instance, certain battery types (e.g., motorcycle batteries) may have a lower weight than other battery types and, therefore, are more suitable for display on a unit having a wall configuration, as illustrated in FIG. 5. However, heavier battery types (e.g., automotive batteries) may be more suitable for display on a charging and display unit configured as a floor unit. Indeed, the configuration of the charging and display unit 92 may vary depending on features of the displayed battery type.

Figure 6:
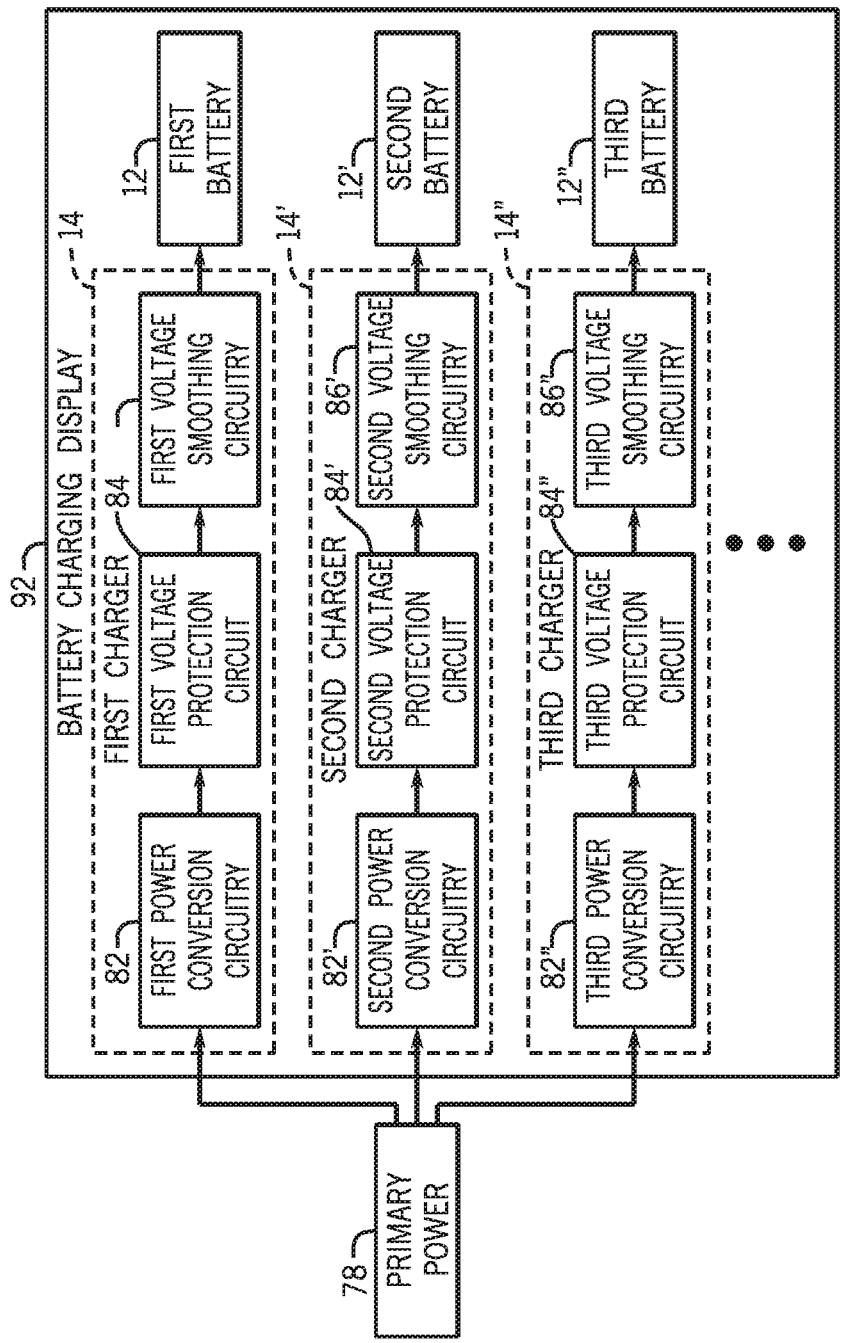
FIG. 6 illustrates an embodiment of a battery charging display and exemplary internal circuitry that may be associated with each charger coupled to the display.

Still further, in certain embodiments, each charging unit 14 associated with each displayed battery device 12 may include separate but parallel charging circuitry, as illustrated in FIG. 6. As shown, the primary power source 78, which may be a wall outlet, a generator, or any other source of power, provides power to separate power conversion circuitry 82, 82', and 82", each associated with a separate charging unit 14, 14', and 14", respectively. As before, each power conversion circuit 82, 82', and 82" conditions the incoming power to produce a power output suitable for charging of the associated battery 12, 12', and 12", respectively. If desired, each voltage protection circuit 84, 84', and 84" ensures that the received power output does not exceed a predetermined voltage threshold for the associated battery 12, 12', and 12", respectively. Also, each voltage smoothing circuit 86, 86', and 86" further smoothes, rectifies, and otherwise processes each power output before each battery 12, 12', and 12", respectively, receives each power output to replenish the respective charge level in each battery. The illustrated embodiment shows three charging circuits. However, any suitable number of circuits corresponding to the quantity of chargers displayed on the battery charging and display unit 92 may be employed in other embodiments.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or resequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A point-of-sale battery case, comprising:
a self-evident base display unit configured to display a plurality of SLI (Starting, Lighting, Ignition) battery units for sale,
at least a first of the plurality of SLI battery units being of a first type comprising a first base unit and one of a first plurality of battery units and
at least a second of the plurality of SLI battery units being of a second type comprising a second base unit different from the first base unit and one of a second plurality of battery units different from the first plurality of battery units;
at least one charger coupled to or disposed on the self-evident base display unit and configured to receive each of the first base unit and the second base unit, to receive primary power, to convert the primary power to a battery power output suitable for charging the SLI battery unit, and to transfer the battery power output to the SLI battery unit to charge the SLI battery unit, wherein the battery unit is removably coupled to the charger in a nesting arrangement; and
an indicator panel for the at least one charger configured to indicate a parameter of a charge level of the SLI battery unit associated with the charger.

2. The battery case of claim 1, wherein the at least one charger comprises a plurality of chargers and each of the plurality of chargers includes separate and parallel charging circuitry configured to provide a corresponding battery power output to the battery unit associated with each charger.

3. The battery case of claim 2, wherein each of the chargers is configured to receive one of a plurality of battery units, each of the plurality of battery units having a substantially different capacity.

4. The battery case of claim 2, wherein the separate and parallel charging circuitry comprises conversion circuitry configured to convert the primary power to the battery power output.

5. The battery case of claim 4, wherein the conversion circuitry comprises a voltage protection circuit configured to limit the battery power output to a threshold voltage, and wherein the conversion circuitry comprises a voltage smoothing circuit configured to smooth, rectify, or process the primary power before the battery power is output to the SLI battery unit.

6. The battery case of claim 1, wherein the self-evident base display unit is configured to display one or more SLI battery accessories for sale.

7. The battery case of claim 6, wherein the one or more SLI battery accessories comprises a battery tray, a charger, or a combination thereof.

8. The battery case of claim 1, wherein the at least one charger is coupled to the SLI battery unit via a tool-less engagement.

9. The battery case of claim 1, wherein the at least one charger is electrically coupled to a wall outlet configured to supply the primary power to the at least one charger.

10. The battery case of claim 1, wherein the at least one charger includes an alignment guide and at least one of the base units includes an indented portion, wherein the alignment guide and the indented portion correspond to form the nesting arrangement.

11. A point-of-sale battery case, comprising:
a self-evident base display unit configured to display a plurality of lead acid battery units for sale, at least a first of the plurality of the lead acid battery units being of a first type comprising a first base unit and one of a first plurality of battery units and at least a second of the plurality of lead acid battery units being of a second type comprising a second base unit different from the first base unit and one of a second plurality of battery units different from the first plurality of battery units, wherein the self-evident base display unit comprises a plurality of shelves, wherein a first shelf of the plurality of shelves is positioned vertically above a second shelf of the plurality of shelves with respect to a base of the self-evident base display unit; and
at least one charger coupled to or disposed on the first shelf, wherein the at least one charger is configured to receive each of the first base unit and the second base unit in a nesting arrangement, to receive primary power, to convert the primary power to a battery power output suitable for charging the lead acid battery unit, and to transfer the battery power output to the battery unit to charge the lead acid battery unit.

12. The battery case of claim 11, wherein the at least one charger comprises a plurality of chargers, wherein a first set of chargers of the plurality of chargers is disposed on the first shelf of the plurality of shelves, and wherein a second set of chargers of the plurality of chargers is disposed on the second shelf of the plurality of shelves.

13. The battery case of claim 12, wherein the first set of chargers is integral with the first shelf.

14. The battery case of claim 11, comprising an indicator panel for the at least one charger configured to indicate a parameter of a charge level of the lead acid battery unit associated with the charger.

15. The battery case of claim 11, wherein the at least one charger is coupled to the lead acid battery unit via a tool-less engagement.

16. The battery case of claim 11, wherein the self-evident base display unit is configured to display one or more lead acid battery accessories for sale.

17. A self-evident base display unit for a point-of-sale case, comprising:
a plurality of shelves configured to display a plurality of lead acid battery units for sale, at least a first of the plurality of lead acid battery units being of a first type comprising a first base unit and one of a first plurality of battery units and at least a second of the plurality of lead acid battery units being of a second type comprising a second base unit different from the first base unit and one of a second plurality of battery units different from the first plurality of battery units; and
at least one charger coupled to or disposed on a shelf of the plurality of shelves and configured to couple to each of the first base unit and the second base unit via a tool-less engagement, to receive primary power, to convert the primary power to a battery power output suitable for charging the lead acid battery unit, and to transfer the battery power output to the lead acid battery unit to charge the lead acid battery unit, wherein the charger is coupled to each of the first base unit and the second base unit in a nesting arrangement.

18. The self-evident base display unit of claim 17, comprising an indicator panel for the at least one charger configured to indicate a parameter of a charge level of the lead acid battery unit associated with the charger.

19. The self-evident base display unit of claim 17, wherein the self-evident base display unit is configured to display one or more lead acid battery accessories for sale.

20. The self-evident base display unit of claim 19, wherein the one or more lead acid battery accessories comprises a battery tray, a charger, or a combination thereof.

* * * * *

UNITED STATES PATENT AND TRADEMARK OFFICE
CERTIFICATE OF CORRECTION

PATENT NO. : 11,557,904 B2
APPLICATION NO. : 15/986580
DATED : January 17, 2023
INVENTOR(S) : Feuell et al.

It is certified that error appears in the above-identified patent and that said Letters Patent is hereby corrected as shown below:

In the Specification

In Column 3, Line 35, delete "16." and insert -- 16. An SLI battery may comprise a lead-acid battery. --, therefor.

Signed and Sealed this
Ninth Day of April, 2024

Katherine Kelly Vidal
*Director of the United States Patent and Trademark Office*